(12) United States Patent
Choisnet (10) Patent No.: US 9,120,542 B2
(45) Date of Patent: Sep. 1, 2015

(54) ANNULAR BUOYANT BODY

(75) Inventor: Thomas Choisnet, Saint Cyr sur Mer (FR)

(73) Assignee: IDEOL, La Ciotat (FR)

( * ) Notice: Subject to any disclaimer, the term of this patent is extended or adjusted under 35 U.S.C. 154(b) by 103 days.

(21) Appl. No.: 13/981,141

(22) PCT Filed: Jan. 25, 2012

(86) PCT No.: PCT/FR2012/050163
§ 371 (c)(1),
(2), (4) Date: Oct. 11, 2013

(87) PCT Pub. No.: WO2012/101383
PCT Pub. Date: Aug. 2, 2012

(65) Prior Publication Data
US 2014/0060411 A1     Mar. 6, 2014

(30) Foreign Application Priority Data

Jan. 25, 2011   (FR) ...................................... 11 50570

(51) Int. Cl.
*B63B 39/00*    (2006.01)
*B63B 1/04*     (2006.01)
*B63B 39/03*    (2006.01)
(Continued)

(52) U.S. Cl.
CPC . *B63B 39/00* (2013.01); *B63B 1/04* (2013.01); *B63B 39/03* (2013.01); *B63B 2035/446* (2013.01); *B63B 2039/067* (2013.01); *B63B 2241/06* (2013.01); *B63B 2241/08* (2013.01); *B63B 2241/12* (2013.01)

(58) Field of Classification Search
CPC .... B63B 39/00; B63B 39/03; B63B 35/4413; B63B 35/44; B63B 35/08; E02B 17/08
USPC ................... 114/122; 405/205, 210, 211, 224
See application file for complete search history.

(56) References Cited

U.S. PATENT DOCUMENTS 5,098,226 A      3/1992  Venugopal
7,086,810 B2 *   8/2006  Masetti et al. ................ 405/224
(Continued)

FOREIGN PATENT DOCUMENTS

EP    1 719 697 A1    11/2006
FR    2 069 975 A1     9/1971

OTHER PUBLICATIONS

Notification of Transmittal of International Preliminary Report on Patentability in corresponding PCT Application No. PCT/FR2012/050163 mailed Nov. 30, 2012, (8 pages).
(Continued)

*Primary Examiner* — Lars A Olson
(74) *Attorney, Agent, or Firm* — Bookoff McAndrews, PLLC (57) ABSTRACT

The invention relates to the field of buoyant bodies, and more particularly to an annular buoyant body (1) including a central moonpool (2), configured such that, in water, with swell of a period substantially equal to a natural period of the buoyant body (1) while it is moving with heave motion, vertical forces exerted on the buoyant body (1) by a mass of water oscillating in the central moonpool (2) in phase opposition relative to the swell, compensate at least partially for the vertical excitation forces exerted on the buoyant body (1) by the swell. The invention also relates to a method of at least partially extinguishing heave motion of the buoyant body (1) at a natural period of the buoyant body (1).

15 Claims, 5 Drawing Sheets

(51) Int. Cl.
  *B63B 35/44* (2006.01)
  *B63B 39/06* (2006.01)

(56) References Cited

U.S. PATENT DOCUMENTS 7,958,835 B2 * 6/2011 Srinivasan .................... 114/264
8,511,246 B2 * 8/2013 Srinivasan .................... 114/264

2006/0045628 A1  3/2006 Masetti et al.
2009/0126616 A1  5/2009 Srinivasan

OTHER PUBLICATIONS

Reply to Communication PCT/IPEA/408 in corresponding PCT Application No. PCT/FR2012/050163 dated Oct. 4, 2012 (8 pages).

* cited by examiner

ANNULAR BUOYANT BODY

CROSS-REFERENCE TO RELATED APPLICATIONS

This application is a National Stage filing under 35 U.S.C. §371 of International Application No. PCT/FR2012/050163, filed Jan. 25, 2012, which claims priority to French Patent Application No. FR1150570, filed Jan. 25, 2011, the contents of each of which are incorporated by reference herein.

The present invention relates to a buoyant body, and to a method of at least partially extinguishing heave motion of such a buoyant body.

Buoyant bodies subjected to swell oscillate in various directions. "Heave" is one such oscillation motion that is induced by swell in a vertical direction. Like other oscillatory motion of buoyant bodies, heave has various drawbacks. Apart from the obvious discomfort that can be experienced on board a buoyant body subjected to such heave, that motion induces high accelerations on the platform that adversely affect the supported structures, especially with swell having a period close to the heave natural period of the buoyant body.

The heave natural period $T_{heave}$ of a buoyant body may be expressed by the following equation:

$$T_{heave} = 2\pi \sqrt{\frac{M + M_a}{\rho g S_0}} \quad (1)$$

where $T_{heave}$ represents the heave natural period, M represents the mass (displacement) of the buoyant body, $\rho$ represents the density of water, g represents acceleration due to gravity, and $S_0$ represents the waterplane area of the buoyant body. $M_a$ represents the added mass of the buoyant body as commonly defined by the person skilled in the art. The added mass $M_a$ varies as a function of the shape of the buoyant body, of its draught, of the period of the swell, and of other factors, and may be computed, for example, by means of a recognized diffraction-radiation code. Unless otherwise indicated, all of the variables in the equations and formulae of the present description use the measurement units of the International System of Units (SI).

The forces exerted on the buoyant body comprise firstly the Froude-Krylov forces associated with the variable pressure field generated by the swell that is not disturbed by the buoyant body, and secondly the diffraction forces associated with the diffraction of the swell by the buoyant body. Those forces can also be computed by means of diffraction-radiation codes.

Buoyant bodies provided with "moonpools" are known to the person skilled in the art, in particular among floating drilling platforms. A "moonpool" is a downwardly-extending opening that passes through the buoyant body while intersecting the waterplane. Their dynamic behavior, and in particular the vertical oscillation ("piston mode") of the mass of water in the moonpool has been perceived as a drawback. In the article entitled "On the piston and sloshing modes in moonpools" (J. Fluid Mech. (2001), vol. 430, pp. 27-50), B. Molin has analyzed this "piston mode" of vertical oscillation of the mass of water contained in such moonpools on floating platforms. However, it has not been proposed to use that oscillation to counter the excitation forces exerted by the swell on the buoyant body.

Each of US Patent Applications US 2009/126616 A1 and US 2006/045628 A1 describes a buoyant body having a moonpool adapted to increase the added mass of water driven vertically with the buoyant body, in order to increase the inertia of the buoyant body and thus in order to increase its heave natural period, so that said natural period is above the normal range of periods for swell. Unfortunately, that suffers from the drawback of leading to an increase in the excitation forces exerted by the swell on the buoyant body.

An object of the invention is to propose a buoyant body in which heave motion is minimized, in particular in the vicinity of the heave natural frequency of the buoyant body.

In at least one embodiment of a buoyant body of the invention, this object is achieved by the fact that the buoyant body is an annular buoyant body including a central moonpool, and is configured such that, in water, with swell of a period substantially equal to a natural period of the buoyant body while it is moving with heave motion, vertical forces exerted on the buoyant body by a mass of water oscillating in the central moonpool in phase opposition relative to the swell, compensate at least partially for the vertical excitation forces exerted on the buoyant body by the swell. In the context of the present description, it should be clear for a person skilled in the art that a "period substantially equal to a heave natural period" does not necessarily mean a period exactly equal to said natural period, but rather that a certain variation relative to said natural period, e.g. a variation plus or minus 15%, is acceptable.

By means of these provisions, it is possible to reduce very significantly the heave motion of the buoyant body. In addition, these provisions offer additional advantages for certain applications. In order for the vertical forces exerted on the buoyant body by a mass of water oscillating in the central moonpool in phase-shifted manner relative to the swell to be able to compensate at least partially for the vertical forces exerted on the buoyant body by the swell, the draught of the buoyant body should normally be limited, and the area of the moonpool should normally be particularly large relative to the waterplane area. Although this increases the overall dimensions of the buoyant body relative to its tonnage, such a wide annular configuration also benefits its static stability, to the extent even of obviating the need for a ballast system, even with superstructures having a particularly high center of gravity, such as wind turbines.

Advantageously, in order to obtain phase opposition between the mass of water oscillating in the central moonpool of the buoyant body and the swell, while also preserving the robustness of the structure of the buoyant body, the natural period $T_{piston}$ of the vertical oscillation piston mode of the mass of water in the central moonpool may lie in the range 1.25 to 1.55 times a natural period $T_{heave}$ of the buoyant body while it is moving with heave motion.

For an approximation of the natural period $T_{piston}$ of the oscillation piston mode of the mass of water in the central moonpool of a buoyant body having substantially vertical walls, it is possible to use the following formula:

$$T_{piston} \cong 2\pi \sqrt{\frac{d + k\sqrt{S_1}}{g}} \quad (2)$$

In this formula, $S_1$ represents the area of the central moonpool, g is acceleration due to gravity, and k is a coefficient that, if the central moonpool is likened to a square opening having the same area, can be considered to be equal to 0.52, as described in the article entitled "On the piston and sloshing modes in moonpools" by B Molin, (J. Fluid Mech. (2001), vol. 430, pp. 27-50).

The ratio between the natural period $T_{piston}$ of the mass of water oscillating in the central moonpool and the natural period $T_{heave}$ of a buoyant body while it is moving with heave motion can thus be expressed by the following formula:

$$\frac{T_{piston}}{T_{heave}} \cong \sqrt{\frac{\rho S_0 (d + 0.52\sqrt{S_1})}{M + M_a}} \quad (3)$$

Therefore, the dimensions of the buoyant body and of its central moonpool may advantageously be as defined by the following formula:

$$1.25 < \sqrt{\frac{\rho S_0 (d + 0.52\sqrt{S_1})}{M + M_a}} < 1.55 \quad (4)$$

where the added mass $M_a$ normally lies in the range 0.45 to 0.85 times the mass M of the buoyant body, depending on its configuration.

Alternatively, it is, however, possible to use digital tools, such as hydrodynamic analysis software that is well known to the person skilled in the art such as WAMIT® Principia Diodore™, ANSYS® AQWA or some other software, for calculating more accurately the natural periods $T_{piston}$ and $T_{heave}$, the extinction period $T_{effort}$, all of the vertical excitation forces exerted on the various buoyant bodies, and the heave response of the buoyant bodies as a function of the period of the swell.

Thus, in at least one particular embodiment, the annular buoyant body includes at least one payload. In particular, this at least one payload may be a device for harnessing energy such as a wind turbine, but also other devices for harnessing marine energy, such as energy from waves, from swell, from tides or from currents, heat energy from the sea, osmotic energy from the sea, or any other types. Among wind turbines, all types of turbines known to the person skilled in the art can be considered, e.g. turbines of horizontal or vertical axis, with one or more rotors, and with or without a gearbox interposed between the rotor and the generator, or with any number of blades.

Since the buoyant body has an annular configuration, the at least one payload may be situated off-center relative to the buoyant body. The annular buoyant body may then have a larger immersed volume in the vicinity of the at least one payload so as to balance the weight of the payload.

In order to keep the buoyant body in position, it may also be provided with at least one anchoring device, such as an anchoring device for anchoring to a turret buoy, a fixed-heading anchoring device, and a cable, chain, or some other anchoring device. In addition, it may also include at least one roll damper device incorporating, for example, an anti-roll keel, an anti-roll tank, or an arrangement of a plurality of anti-roll tanks interconnected via U-shaped tubes, etc.

In order to adjust the dynamic properties of the buoyant body, it is, for example, possible to increase the added mass of water that follows the buoyant body in its vertical motion by incorporating at least one external appendage into the buoyant body, such as, for example, a skirt or plates. It is also possible to incorporate into the buoyant body at least one appendage in the central moonpool so as to adjust both the heave natural period and also the swell period at which the mass of water in the central moonpool oscillates in phase opposition relative to the swell. With such appendages, the added mass $M_a$ of water oscillating with the buoyant body may lie in the range 0.55 to 0.85 times the mass M of the buoyant body, whereas, without these appendages, the added mass $M_a$ may lie in the range 0.45 to 0.65 times the mass M of the buoyant body. In order to increase the viscous damping of the sloshing of the mass of water, the buoyant body may also include, in a periphery of the central moonpool, at least one roll-damping chamber in restricted communication with the central moonpool.

The present description also provides a method of at least partially extinguishing heave motion of a buoyant body that is floating in water subjected to swell of a period substantially equal to a heave natural period, wherein said buoyant body is provided with a central moonpool in which a mass of water oscillates in phase opposition relative to the swell, in order to exert on the buoyant body vertical forces that oppose vertical excitation forces exerted by the swell.

The invention can be well understood and its advantages appear more clearly on reading the following detailed description of embodiments shown by way of non-limiting example. The description refers to the accompanying drawings, in which.

Figure 1A:
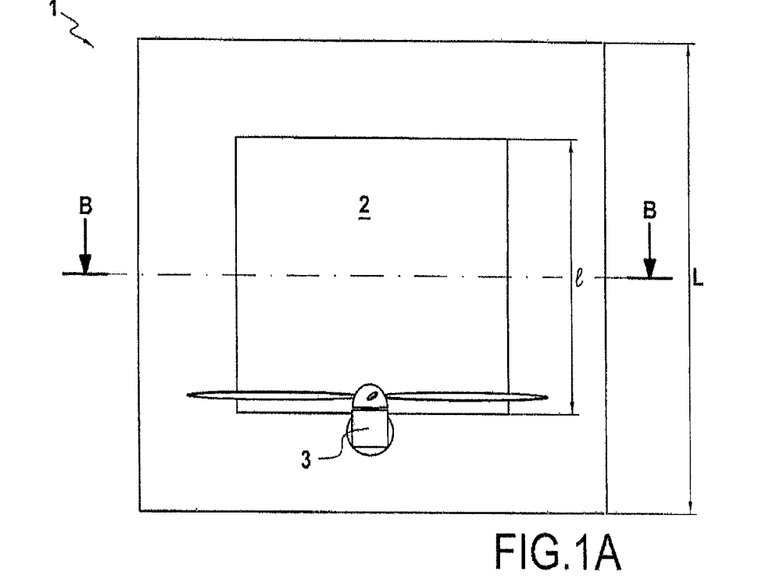
FIG. 1A is a diagrammatic view of the top of a first embodiment of a buoyant body of the invention.
Figure 1B:
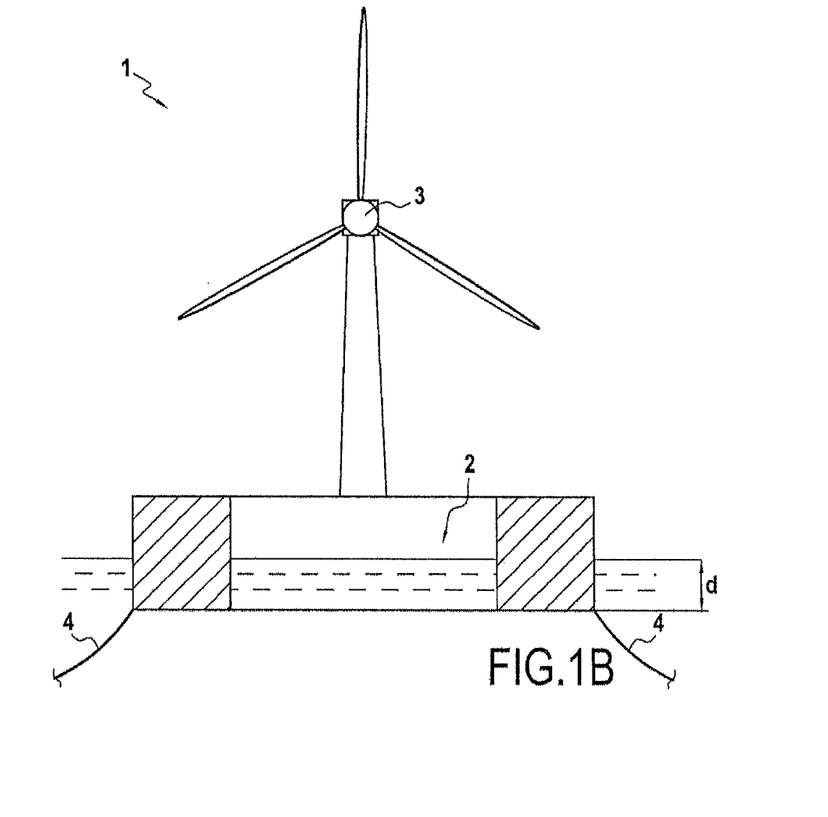
FIG. 1B is a diagrammatic side view of the buoyant body of FIG. 1A.

A first embodiment of an annular buoyant body 1 of the invention is shown in FIGS. 1A and 1B. This buoyant body 1 has a square shape and is provided with a central moonpool 2 that is also square in shape. The buoyant body 1 is also provided with a wind turbine 3 situated off-center on the buoyant body 1. Although the wind turbine 3 that is shown is a turbine with a horizontal-axis rotor, it is possible to consider other types of wind turbine, of horizontal or vertical axis, with one or more rotors, and with or without a gearbox interposed between the rotor and the generator, or with any number of blades. It is also possible to install a plurality of wind turbines on the same buoyant body. In addition, and alternatively, such a buoyant body can also serve to support other types of installation, such as, for example, other types of devices for harnessing marine energy, such as energy from waves, from swell, from tides or from currents, heat energy from the sea, osmotic energy from the sea, or any other types. The buoyant body 1 is also provided with an anchoring device comprising, in this embodiment, a plurality of anchor lines 4. However, other alternative anchoring devices known to the person skilled in the art may also be considered.

The buoyant body 1 has a shallow draught, enabling it to be used in shallow water, and a small amount of freeboard, offering easy access for the operations of maintaining the wind turbine 3.

The buoyant body 1 and its moonpool 2 are dimensioned such that, in the water, with swell having a period substantially equal to a heave natural period of the buoyant body, the mass of water in the central moonpool 2 oscillates substantially in phase opposition with the swell. In this way, the vertical forces exerted on the buoyant body by said mass of water oscillating in the central moonpool substantially in phase opposition relative to the swell, are also substantially in phase opposition to the vertical excitation forces exerted on the buoyant body by the swell.

The person skilled in the art knows diffraction-radiation code capable for calculating both the added mass $M_a$ and the vertical forces exerted by the swell and by the vertical oscillation of the mass of water in the central moonpool 2 as a function of the period of the swell for various configurations of the buoyant body 1, and thus the optimum ratio between the natural period $T_{piston}$ and the natural period $T_{heave}$ for extinguishing vertical excitation forces. For a buoyant body 1 having the configuration shown in FIGS. 1A and 1B, the added mass $M_a$ is about 0.55 times M, whereas the optimum $T_{piston}/T_{heave}$ ratio for obtaining phase opposition of the mass of water in the central moonpool relative to the swell lies in the range 1.25 to 1.55, and in particular around 1.40. By applying these values to the equation (3), it can be deduced that, if the central moonpool 2 is square, the length l of a side of the central moonpool 2 is about 4.0 times the draught d. If this ratio is applied as a substitute for the draught d in the equation for the displacement of the square buoyant body 1:

$$M=\rho(L^2-l^2)d \quad (5)$$

the following third-degree polynomial is obtained:

$$\frac{\rho}{4.0}l^3 - \frac{\rho L^2}{4.0}l + M = 0 \quad (6)$$

Starting from a given displacement M and from a given length L of the buoyant body 1, it is thus possible to calculate the optimum size of the central moonpool 2 so as to obtain phase opposition of the mass of water in the central moonpool relative to the swell and thus obtain at least partial extinction of the vertical excitation forces exerted on the buoyant body 1. Starting from the lengths L and l and from the displacement M, the draught d can also be computed directly.

Thus, for at least partial extinction of the vertical excitation forces on a square buoyant body 1 with a displacement M of 5900 metric tonnes (t) and a side length L of 39 meters (m), at the heave period $T_{heave}$ of the buoyant body 1, each side of its central moonpool 2, which is also square, may have a length l of 23 m. With these dimensions, and in sea water having a density of about 1027 kilograms per cubic meter (kg/m³), the buoyant body 1 has a draught d of 5.8 m. Within the range defined by the formula (4), if the square shape with L=39 m and l=23 m is maintained, alternative embodiments may be considered with different tonnages and a draught lying in the range 4.4 m to 8.4 m.

Figure 2:
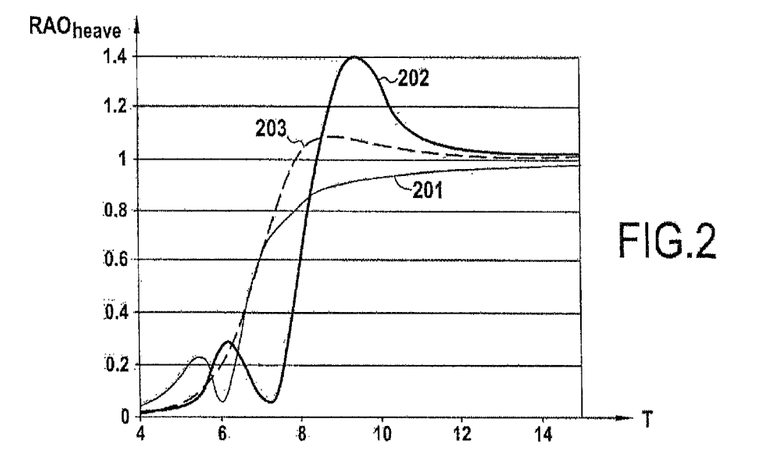
FIG. 2 is a comparative graph showing the heave response of the buoyant body of FIG. 1A as a function of the period of the swell, compared with a buoyant body without a central moonpool, and with an annular buoyant body that is not configured so that the mass of water in the central moonpool compensates at least in part for the vertical force exerted by the swell.

FIG. 2 shows the responses of the buoyant body 1, of another buoyant body also provided with a central moonpool but that is not optimized to minimize the heave of the buoyant body, and of a buoyant body that is not provided with a central moonpool. The curve 201 represents the transfer function $RAO_{heave}$ (heave response-amplitude operators) between the amplitude of the swell and the amplitude of the heave of the buoyant body 1. By way of comparison, the curve 202 represents the transfer function between the amplitude of the swell and the amplitude of the non-optimized annular buoyant body, and the curve 203 represents that corresponding to a buoyant body not provided with a central moonpool.

As can be seen in curve 203, the buoyant body not provided with a central moonpool has a natural period of about 8.5 seconds (s), at which the transfer function $RAO_{heave}$ reaches a maximum of 1.08. The non-optimized annular buoyant body that has its response represented by curve 202 has a maximum that is even more marked of nearly 1.4 at a natural period of about 9.5 s. Conversely, the curve 201 corresponding to the first embodiment of the annular buoyant body 1 does not have such a maximum, and does not exceed a value of 1.

Figure 3A:
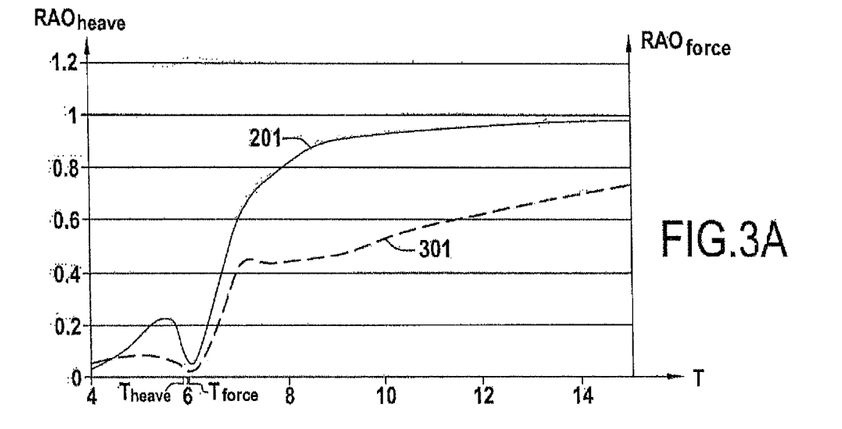
FIG. 3A is a graph showing both the heave response of the buoyant body of FIG. 1A and the overall vertical excitation forces exerted on said buoyant body, as a function of the period of the swell.

This is due to the fact that the heave natural period $T_{heave}$ of the buoyant body 1 that, in this example is 5.8 s, corresponds approximately to a minimum in the amplitude of the vertical excitation force exerted by the water on the buoyant body 1. In FIG. 3A, in which the curve 201 is superposed on a curve 301 representing the transfer function $RAO_{effort}$ (force response-amplitude operators) between the amplitude of the swell and the amplitude of all of the vertical excitation forces on the buoyant body 1, it is possible to see how this curve 301 has a minimum at a period $T_{effort}$, in this example 6.1 s, that is very close to the heave natural period $T_{heave}$ of the buoyant body 1. This is caused by the vertical oscillation of the mass of water in the central moonpool 2, phase-shifted relative to the swell and cancelling at least in part the excitation force exerted by the swell on the buoyant body 1 at said period $T_{effort}$ and at periods close thereto, as represented diagrammatically in FIGS. 4A and 4B.

Figure 4A:
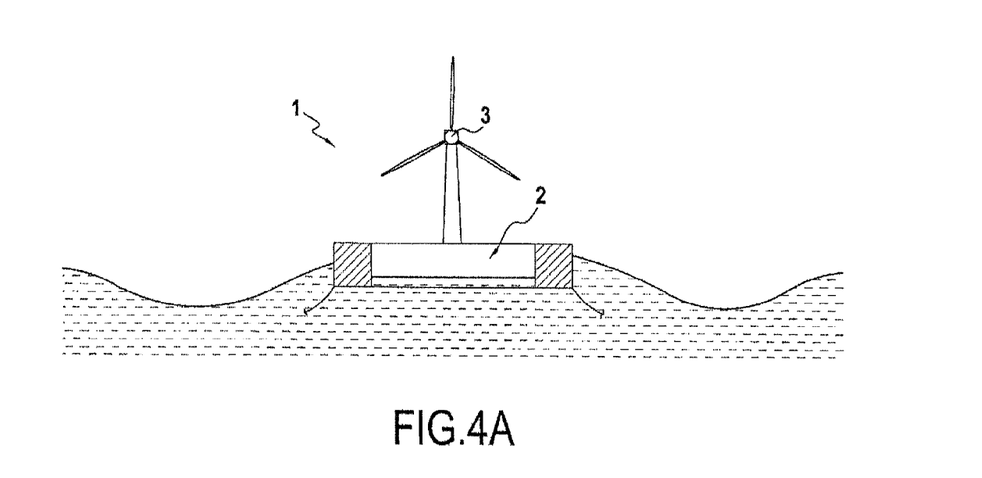
FIGS. 4A and 4B diagrammatically show the motion of the buoyant body of FIG. 1A and of the mass of water in its central moonpool with swell close to or equal to the heave natural period of the buoyant body.
Figure 4B:
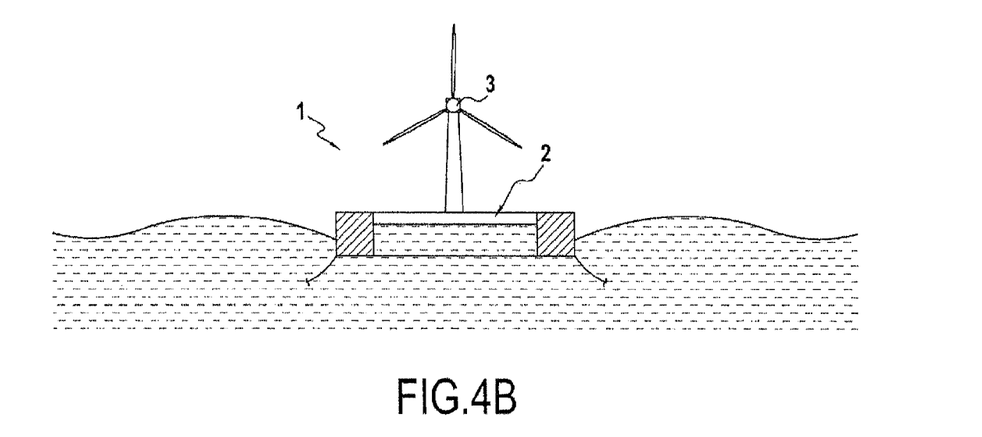

The piston-mode vertical oscillation of the mass of water contained in the central moonpool 2 is then in phase opposition relative to the swell. The inflows and outflows of this mass of water generate an oscillating flow around the buoyant body 1 that comes to compensate at least in part for the pressure field of the swell on the buoyant body 1. This can also be expressed as a phase opposition between the Froude-Krylov forces and the diffraction forces exerted on the buoyant body.

For the device to be properly effective, the piston-mode natural period $T_{piston}$ should be greater than the heave natural period $T_{heave}$ of the buoyant body. The extinction period of the excitation forces is, in general, interposed between the piston-mode natural period $T_{piston}$ and the heave natural period $T_{heave}$ of the buoyant body 1. Thus, in general, $T_{heave} < T_{effort} < T_{piston}$.

Figure 3B:
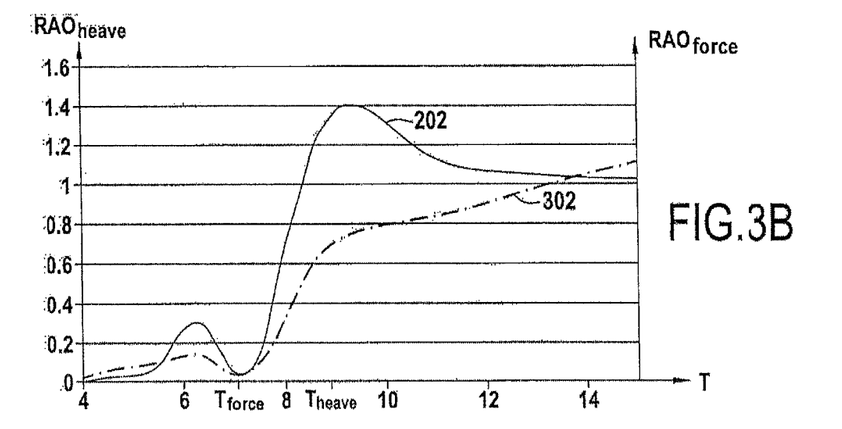
FIG. 3B is a comparative graph showing the heave response of a buoyant body that is not configured so that the mass of water in the central moonpool compensates at least in part for the vertical excitation forces exerted by the swell.

By way of comparison, in FIG. 3B, the curve 202 of the response $RAO_{heave}$ of the non-optimized annular buoyant body is superposed on a curve 302 representing the transfer function $RAO_{effort}$ between the amplitude of the swell and the amplitude of the vertical excitation forces on the non-optimized annular buoyant body, and that has a heave natural period $T_{heave}$ of 9.5 s. Since, in this case, the period $T_{heave}$ is not close to the period $T_{effort}$, the excitation forces exerted by the swell on the non-optimized buoyant body are not significantly reduced by the vertical oscillation of the mass of water in the central moonpool. On the contrary, the heave resonance is actually made worse than for a buoyant body that is not provided with a central moonpool.

Figure 5A:
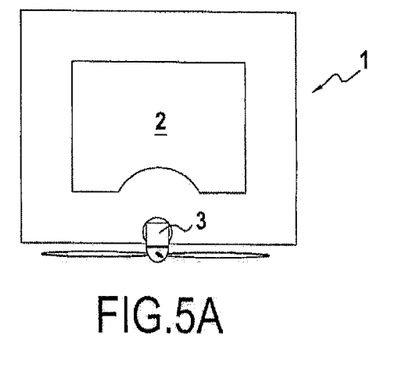
FIGS. 5A, 5B, 5C, and 5D are diagrammatic views of the tops of various embodiments of buoyant bodies of the invention.
Figure 5B:
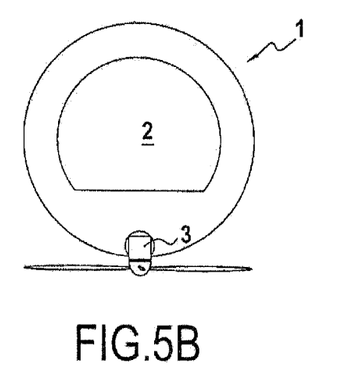
Figure 5C:
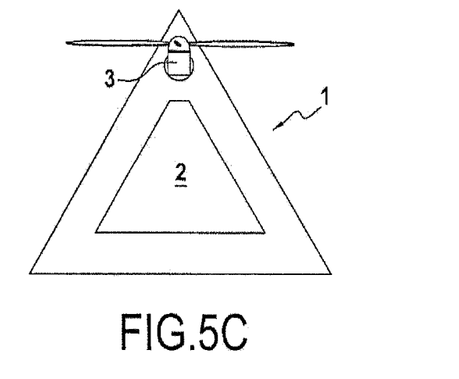
Figure 5D:
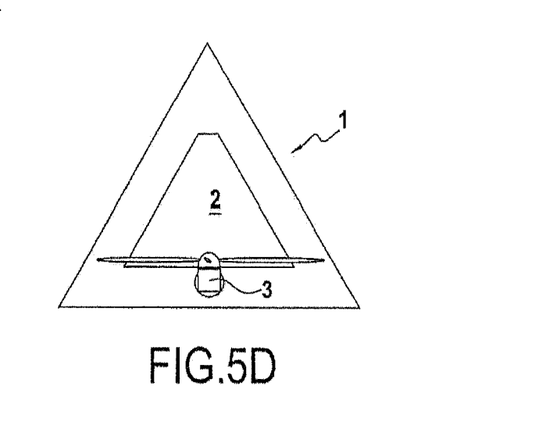

In order to balance the buoyant body 1 and in order to compensate for the weight of the wind turbine 3, the buoyant body 1 is ballasted on its side opposite from said wind turbine 3. However, in an alternative embodiment shown in FIG. 5A, the ballast weight can be minimized by increasing the immersed volume, and thus the displacement, of the buoyant body 1 in the vicinity of the wind turbine 3. In addition, in other embodiments, the buoyant body 1 may have shapes other than the square shape of the first embodiment. Thus, in the embodiment shown in FIG. 5B, the buoyant body 1 has a circular shape, and, in the embodiments shown in FIGS. 5C and 5D, it has triangular shapes.

The various embodiments of the buoyant bodies of the invention may be built of a variety of materials, such as, for example, ferrous metal materials, such as steel, or non-ferrous materials, such as aluminum or its alloys, mineral materials such as concrete, or synthetic materials, including composite materials, as well as combinations of a plurality of such different materials.

Figure 6A:
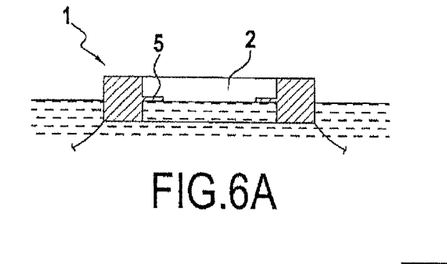
FIGS. 6A, 6B, and 6C diagrammatically show three different embodiments of buoyant bodies with horizontal plates projecting into the central moonpools.
Figure 6B:
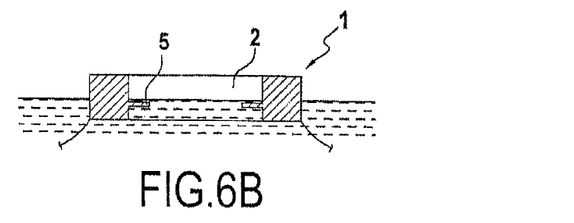
Figure 6C:
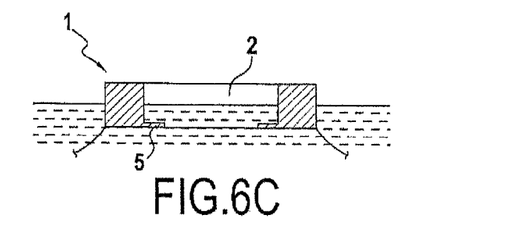
Figure 7:
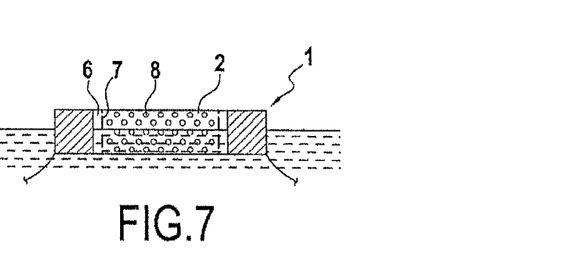
FIG. 7 diagrammatically shows an embodiment of a buoyant body with damping chambers around the central moonpool.
Figure 8:
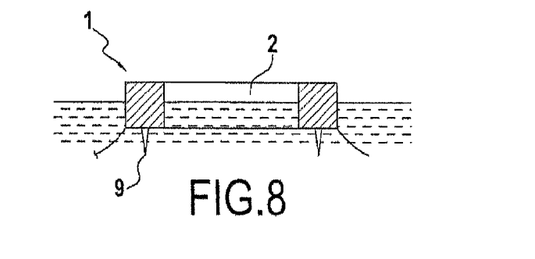
FIG. 8 diagrammatically shows an embodiment of a buoyant body with anti-roll keels.
Figure 9:
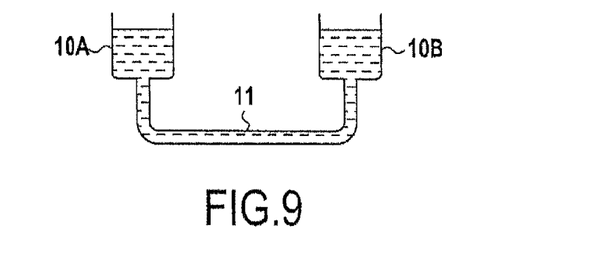
FIG. 9 diagrammatically shows another embodiment of an anti-roll device for a buoyant body.

In addition, any one of the embodiments of the buoyant body may also include appendages around its outside periphery and/or in the central moonpool, in order to increase the added mass of water accompanying the buoyant body in its vertical motion and/or in order to change the natural period $T_{piston}$ of the piston mode of oscillation of the mass of water in the central moonpool. FIGS. 6A, 6B, and 6C thus show three potential configurations for horizontal plates 5 installed around the periphery of the central moonpool 2 of such a buoyant body 1 in order to adjust the natural period $T_{piston}$. In order to damp sloshing of the water in the central moonpool 2, the moonpool may also have damping chambers 6 around its periphery and separated from the center of the central moonpool 2 by walls 7 having orifices 8 through which water can pass as shown in FIG. 7. Roll-damping devices, such as, for example anti-roll keels, or active or passive anti-roll tank arrangements, can also be incorporated into the buoyant body. FIG. 8 shows a buoyant body 1 with anti-roll keels 9 whose hydrodynamic resistance damps the roll oscillations of the buoyant body. A passive anti-roll tank is a tank containing a mass of liquid and dimensioned such that the sloshing of the liquid damps the roll. An active arrangement of anti-roll tanks, shown in FIG. 9, includes two anti-roll tanks 10A and 10B, interconnected via their bottoms via a U-shaped tube 11, and filled with a mass of liquid. In this case, the roll induces a displacement of liquid, through the tube 11, between the tanks 10A and 10B. By the resistance of the tube 11 to the flow of liquid, it is possible to damp the roll. The tube 11 may also be provided with means for adjusting this resistance to flow.

Although the present invention is described with reference to specific embodiments, it is clear that various modifications and changes may be made to these examples without going beyond the general scope of the invention as defined by the claims. Therefore, the description and the drawings should be considered as being given illustratively rather than restrictively.

The invention claimed is:

1. An annular buoyant body including a central moonpool, configured such that, in water, with swell of a period substantially equal to a natural period of the buoyant body while it is moving with heave motion, vertical forces exerted on the buoyant body by a mass of water oscillating in the central moonpool in phase opposition relative to the swell, compensate at least partially for the vertical excitation forces exerted on the buoyant body by the swell.

2. An annular buoyant body according to claim 1, configured in such a manner that a natural period $T_{piston}$ of a vertical oscillation piston mode of said mass of water in the central moonpool lies in the range 1.25 to 1.55 times a natural period $T_{heave}$ of the buoyant body while it is moving with heave motion.

3. An annular buoyant body according to claim 2, with a waterplane area $S_0$, an area $S_1$ of the central moonpool in a waterplane, a draught d and a mass M as defined in the following formula:

$$1.25 < \sqrt{\frac{\rho S_0 (d + 0.52\sqrt{S_1})}{M + M_a}} < 1.55$$

where $\rho$ is the density of the water and $M_a$ is the added mass of water oscillating in phase with the buoyant body and corresponding to in the range 0.45 to 0.85 times the mass M of the buoyant body.

4. An annular buoyant body according to claim 1, including at least one payload.

5. An annular buoyant body according to claim 4, wherein said at least one payload includes at least one energy harnessing device.

6. An annular buoyant body according to claim 4, wherein at least one payload is situated off-center relative to the buoyant body.

7. An annular buoyant body according to claim 6, having a larger immersed volume in the vicinity of the at least one payload.

8. An annular buoyant body according to claim 1, further including at least one anchoring device.

9. An annular buoyant body according to claim 1, further including at least one roll-damping device.

10. An annular buoyant body according to claim 1, further including at least one appendage that is external and/or that is inside the central moonpool in order to adjust the hydrodynamic characteristics of the buoyant body.

11. An annular buoyant body according to claim 1, further including, in a periphery of the central moonpool, at least one roll damping chamber in restricted communication with the central moonpool.

12. A method of at least partially extinguishing heave motion of a buoyant body that is floating in water subjected to swell of a period substantially equal to a heave natural period, wherein said buoyant body is provided with a central moonpool in which a mass of water oscillates in phase opposition relative to the swell, in order to exert on the buoyant body vertical forces that oppose vertical excitation forces exerted by the swell.

13. A method according to claim 12, in which the natural period $T_{piston}$ of a vertical oscillation piston mode of said mass of water in the central moonpool lies in the range 1.25 to 1.55 times a natural period $T_{heave}$ of the buoyant body while it is moving with heave motion.

14. A method according to claim 13, in which the buoyant body has a waterplane area $S_0$, an area $S_1$ of the central moonpool in a waterplane, a draught d and a mass M as defined in the following formula:

$$1.25 < \sqrt{\frac{\rho S_0(d + 0.52\sqrt{S_1})}{M + M_a}} < 1.55$$

where $\rho$ is the density of the water and $M_a$ is the added mass of water oscillating in phase with the buoyant body and corresponding to in the range 0.45 to 0.85 times the mass M of the buoyant body.

15. An annular buoyant body according to claim 5, wherein at least one payload is situated off-center relative to the buoyant body.

* * * * *